[US Patent 2,756,267 — July 24, 1956]

2,756,267
PROCESS FOR THE SEPARATION OF DIOLEFINS FROM HYDROCARBON MIXTURES

John C. Hillyer, Bartlesville, and Asa C. Dees, Cushing, Okla., assignors to Phillips Petroleum Company, a corporation of Delaware No Drawing. Application July 11, 1952, Serial No. 298,467

13 Claims. (Cl. 260—681.5)

This invention relates to a process for the separation of diolefins from low boiling hydrocarbon mixtures wherein an improved cuprous halide reagent is employed. In a more specific aspect this invention relates to a method for the preparation of a cuprous halide reagent for the improved separation of diolefins from low boiling hydrocarbon mixtures.

Solid-type cuprous halide reagents have been proposed for separating diolefins from hydrocarbon mixtures. These solid reagents comprise non-adsorbent carriers impregnated with the metal salt. They are applicable for use with either liquid or gaseous hydrocarbon mixtures. A solid addition product is formed by reaction of the diolefin with the metal halide and this product is retained by the reagent until the diolefin recovery step is effected. These solid reagents are generally prepared by mixing the dry powdered cuprous halide with a non-adsorbent carrier. In some instances it is preferred that the carrier be treated with a high boiling oleaginous liquid such as lubricating oil, castor oil, or the like.

While the above-described solid reagents are quite satisfactory, they do not always exhibit the activity that is expected even when they are prepared in the prescribed manner. In some instances the reagents are highly active while in other cases only moderate or low activity is demonstrated. The reason for this difference in effectiveness is not clearly understood.

In at least one modification of our invention at least one of the following objects is obtained.

It is an object of this invention to provide an improved process for the separation of diolefins from hydrocarbon mixtures.

It is another object to provide a method for preparing an improved cuprous halide reagent.

It is another object to provide a method for the separation of diolefins from hydrocarbon mixtures which comprises employing a reagent which has a high selectivity toward the diolefins.

We have discovered a method for preparing a diolefin separation reagent which provides a reagent having greatly improved activity and capacity for diolefins.

The solid-type cuprous halide reagents of our invention are exceedingly active and have a high capacity for reaction with diolefins. The method of preparation of these reagents is different from that heretofore employed and is apparently responsible in large part for their unusually high activity. The method of preparation of our improved separation reagent comprises precipitation of the solid diolefin-cuprous halide complex from a solution of the cuprous halide, separation and drying of the precipitate, and then intimately mixing it with a carrier comprising a granulated cellulosic fibrous material. The reagent is finally prepared for use by heating it to decompose the diolefin-cuprous halide addition compound thus leaving cuprous chloride incorporated with the carrier.

When preparing the cuprous halide reagents herein described, a solution of the cuprous halide is first prepared. The cuprous halide most frequently employed is cuprous chloride. It is frequently preferred to use 1-butene as the solvent although other low-boiling aliphatic olefins can also be employed. The dry salt is added to the solvent and the mixture generally stirred or agitated by any means desired to effect solution. Solutions of any concentration up to saturated solutions can be prepared and used in this process. Aqueous solutions of cuprous halides are also applicable and can be prepared by dissolving the cuprous halide in an aqueous mixture of an ammonium salt and ammonia, e. g. cuprous chloride can be dissolved in an aqueous mixture of ammonium chloride and ammonia.

Preparation of the diolefin-cuprous halide addition compound is effected by adding a conjugated diolefin such as 1,3-butadiene to a solution of the cuprous halide. The pure diolefin is introduced into the solution generally at a temperature in the range between —20 and 80° F. If 1-butene is employed as the solvent, the temperature is generally maintained in the range between —20 and +20° F. in order that the solvent will remain in the liquid state at atmospheric pressure. If an aqueous solution of the cuprous halide is employed, temperatures up to 80° F. can be conveniently used. However, it is generally preferred that temperatures not greater than 60° F. be employed. The addition compound precipitates and is separated by any suitable means such as filtration or centrifugation and dried, preferably in an inert atmosphere such as nitrogen.

The dry diolefin-cuprous halide addition compound is intimately mixed with a non-adsorbent carrier, generally by mechanical agitation, to obtain a uniform mixture of high cuprous halide content and of excellent permeability for vapor flow. This mixture is then heated to a temperature generally in the range between 140 and 210° F. and preferably from 170 to 210° F. to decompose the addition compound and leave a reagent comprising a carrier on which a cuprous halide is deposited. The amount of cuprous halide in the reagent can be varied rather widely with the upper limit being measured by the tendency of the salt to sift or settle from the reagent mass. In general, the amount of cuprous halide does not exceed 75 per cent by weight of the final reagent mixture and it can be as low as 25 per cent or even less.

In the preparation of the cuprous halide reagents of this invention, a granulated cellulosic fibrous material such as sawdust of suitable mesh size, e. g. that which will pass an eight or ten mesh screen and stop on a 20 or 30 mesh screen, is an excellent carrier from the standpoint of cost, availability, and density. Other types of carriers such as expanded vermiculite and other non-adsorbent materials are applicable but are generally not preferred. The carriers are preferably of such character as to have a light structure which permits loose packing, such structure being desirable in order to prevent packing during use and to provide sufficient contact surface for the metal salt.

Sawdust from various kinds of wood can be used but, regardless of the kind, in most cases it has been found desirable first to extract the sawdust with solvents to remove the natural oils and/or resins that are present and which might interfere with the treating process. With pine sawdust, for example, extraction by simple soaking with several volumes of acetone and/or benzene can be used, or the extraction is satisfactorily complete by washing with a hydrocarbon solvent such as heptane or pentane. In some instances washing with a hydrocarbon solvent and then with acetone is preferred. After extraction the drained sawdust is heated to drive out the solvent, ordinarily at a temperature of at least 150° F. and generally in the range from 180 to 225° F. It is believed that the extraction step is advantageous since oily and resinous materials can be removed which might be reactive with the metal salt of the reagent or with components of the hydrocarbon mixtures being treated.

The extracted and dried sawdust is sprayed or otherwise contacted with a high-boiling oleaginous liquid, one function of which is to prepare the carrier to retain the cuprous chloride. Oils such as lubricating oil, castor oil and other similar materials which are substantially inert toward all components of the reagent and the hydrocarbon vapors to be treated are applicable and are furthermore of high enough boiling point to undergo substantially no vaporization under conditions used in the process. When using either motor lubricating oil or castor oil, enough oil is sprayed onto the sawdust from an atomizing spray to amount to from about 25 to 50 weight per cent of the sawdust or about 2 to about 10 per cent or more by weight of the finished reagent.

The oil and sawdust can be tumbled in a drum to distribute the oil evenly over the sawdust.

When operating according to the process of this invention, a hydrocarbon mixture in the gaseous or vapor state containing a conjugated diolefin such as butadiene is passed at a suitable flow rate and reduced temperature over a bed of separation reagent prepared as hereinbefore described. When a predetermined amount of butadiene is removed by the reagent, the gas flow is stopped, the reagent is freed of unreacted hydrocarbons, and the diolefin is recovered by heating to decompose the butadiene-cuprous halide addition compound. Unreacted hydrocarbons are removed by evacuation or by passing a non-condensible flush gas through the material. Temperatures at this stage in the process are generally in the range between 80 and 120° F. but lower temperatures can be used, such as those used in the absorption step.

In the absorption cycle, the separation reagent is usually held at temperatures in the range from —20 to +80° F. since the formation of the addition product is favored by these reduced temperatures. It is ordinarily preferred to operate at temperatures in the range from 10 to 60° F.

Pressures employed are generally atmospheric or very low superatmospheric, i. e. not more than five or ten pounds per square inch gage. In the absorption step low pressures are necessary to avoid condensation of the hydrocarbons since the temperature of operation is probably near the dewpoint of the gas mixtures being treated.

For desorption of the conjugated diolefin by decomposing the cuprous halide addition compound, temperatures in the range between 140 and 210° F. or higher are required with temperatures in the range between 170 and 210° F. being most generally preferred.

Flow rates are generally adjusted so that substantially complete absorption of the conjugated diolefin is obtained. Flow rates will vary with the diolefin content of the hydrocarbon mixture to be treated. With a diolefin concentration of from one to fifty volume per cent, space velocities of 100 to 2,000 gas volumes per hour per volume of reagent can be employed with 100 to 1,000 gas volumes per hour per volume of reagent being most frequently preferred.

*Example I*

Three cuprous chloride reagents were prepared in the following manner:

(1) A sample of commercial cuprous chloride, 70 per cent pure, was dissolved in pure 1-butene and an excess of pure 1,3-butadiene was then passed into this solution while the temperature was maintained at —10° F. The butadiene-cuprous chloride addition compound which formed was filtered and dried in an atmosphere of nitrogen to free it of butadiene and 1-butene.

Pine sawdust (about 10 mesh) was deresinated by treating 84 grams of it for 30 minutes with 450 cc. n-heptane. It was treated with a second 450 cc. portion of n-heptane for 12 hours and then with three 450 cc. portions of acetone, the first two treating periods being one hour each and the last being 20 minutes. The sawdust was drained and then dried for 10 hours at 221° F.

The deresinated sawdust was sprayed with 10–H lubricating oil and intimately mixed with the butadiene-cuprous chloride addition compound. This mixture was transferred to a reagent tower constructed from 44 inches of ¾ inch pipe and provided with a means for temperature control. The tower was swept out with nitrogen, evacuated to 27 inches mercury, and then heated at 200° F. until the addition compound was decomposed. The composition of the final reagent was as follows:

| | Weight percent |
|---|---|
| Sawdust | 16 |
| Oil | 9 |
| Cuprous chloride | 75 |

(2) Pine sawdust was prepared as described in (1) and sprayed with castor oil. Dry cuprous chloride, 70 per cent pure, was intimately mixed with the oil-sprayed sawdust to form a solid reagent having the following composition:

| | Weight percent |
|---|---|
| Sawdust | 20 |
| Oil | 5 |
| Cuprous chloride | 75 |

(3) A sample of commercial cuprous chloride, 70 per cent pure, was purified by extracting it with pure, dry 1-butene and then heating the extract to drive off the solvent. The dry powder which remained was kept in an atmosphere of dry nitrogen.

Deresinated pine sawdust, prepared as described in (1), was sprayed with 10–H lubricating oil and intimately mixed with the purified cuprous chloride to give a reagent having the following composition:

| | Weight percent |
|---|---|
| Sawdust | 20 |
| Oil | 10 |
| Cuprous chloride | 70 |

(4) An excess of pure 1,3-butadiene was passed over each absorption reagent which was contained in a tower as described in (1). The flow rate in each case was two volumes butadiene per volume of reagent per minute. Absorption temperatures varied from 40 to 51° F. Each tower was then evacuated to remove any unreacted butadiene and then heated to temperatures ranging from 170 to 200° F. The desorbed butadiene was collected, in each case, in a cylinder maintained at Dry Ice temperature. The following table shows absorption and desorption temperatures and the results obtained.

| Reagent | Absorption Temp., °F. | Desorption Temp., °F. | Butadiene Recovered Per 100 Grams of Pure CuCl in Reagent | Percent of Theoretical Capacity Based on Pure CuCl |
|---|---|---|---|---|
| 1 | 46–51 | 180–200 | 15.5 | 57.0 |
| 2 | 46–47 | 170–195 | 2.6 | 9.5 |
| 3 | 40–42 | 180–200 | 2.4 | 8.8 |

These data show that the reagent prepared with the butadiene-cuprous chloride adduct is much more active and efficient than the other two reagents prepared by mixing either commercial or purified cuprous chloride with oil-sprayed sawdust.

*Example II*

A solid cuprous chloride reagent was prepared as described in (1) of Example I. This reagent was employed to remove the butadiene from two different hydrocarbon streams. Two runs were made with one hydrocarbon stream, using different flow rates. The composition of each stream was as follows (components expressed in weight per cent):

|  | Stream | |
|---|---|---|
|  | 1 | 2 |
| Butadiene | 9.0 | 7.9 |
| n-Butane | 1.3 | 31.0 |
| Isobutylene | 9.3 | 6.4 |
| 1-Butene | 49.2 | 33.8 |
| Propane | 15.3 | 10.4 |
| Propylene | 15.8 | 10.3 |

In each case the hydrocarbon feed mixture was flashed in a vaporizer, conducted through the reagent bed, and finally condensed in a container cooled to Dry Ice temperature. The absorption step was carried out at temperatures in the range from 43 to 50° F. Prior to the desorption step the tower was evacuated to 27 inches mercury for 10 minutes to remove any unabsorbed materials. The tower was then heated at a temperature in the range from 180 to 200° F. to effect desorption. The desorbed material was collected in a cylinder maintained at Dry Ice temperature. The following table shows the operating conditions and the results obtained:

|  | Hydrocarbon Streams | | |
|---|---|---|---|
|  | 1 | 1 | 2 |
| Absorption temperature, °F | 45–50 | 43–45 | 44–48 |
| Flow rate, vols., gas mixture/vol. reagent/min | 4 | 2 | 2 |
| Grams butadiene charged/100 grams CuCl in reagent [1] | 28 | 16 | 16 |
| Desorption temperature, °F | 200 | 180–200 | 180–190 |
| Reagent capacity: |  |  |  |
| Grams butadiene recovered/100 grams pure CuCl in reagent | 17.1 | 12.3 | 8.7 |
| Percent of theoretical capacity based on pure CuCl | 62.9 | 45.2 | 31.9 |

[1] The total theoretical absorption capacity of 100 grams of pure CuCl is 27.2 grams butadiene.

Reasonable modifications and variations are possible within the scope of the disclosure of the present invention the essence of which is that an improved diolefin separation reagent is provided by dissolving a cuprous halide in an inert solvent; reacting same with a diolefin; separating and drying a resulting precipitate; mixing the precipitate with a deresinated sawdust containing an outside film of oil; and heating the mixture to decompose the complex.

We claim:

1. A process for the separation of diolefins from a mixture containing the same which comprises preparing an improved reagent by dissolving a cuprous halide in an inert solvent; treating a resulting solution with a conjugated diolefin so as to form a precipitate of a resulting addition product; separating and drying said addition product; intimately mixing said addition product with a granulated cellulosic fibrous carrier; decomposing said addition product so as to liberate diolefins therefrom and leave a resulting cuprous halide incorporated with said carrier; and employing said reagent in the cyclic step of contacting said diolefin containing mixture in vapor phase with said cuprous halide incorporated with said carrier to form said addition product, and decomposing said addition product to liberate diolefins.

2. The process of claim 1 wherein said granulated cellulosic fibrous carrier is sawdust which has been treated with a solvent so as to remove natural oils and resins and which has been contacted with from 1 to 10 weight per cent of a high-boiling oleaginous liquid inert to the components of the said addition product.

3. The process of claim 2 wherein the cuprous halide is cuprous chloride, the inert solvent is 1-butene and the conjugated diolefin is 1,3-butadiene.

4. A method for preparing an improved reagent for the vapor phase separation of diolefins from low boiling hydrocarbon mixtures containing the same which comprises dissolving a cuprous halide in an inert solvent; treating a resulting solution with a conjugated diolefin so as to form a precipitate of a resulting addition product; separating and drying said addition product; intimately contacting said addition product of diolefin and cuprous halide with a granulated cellulosic fibrous material; and decomposing said addition product so as to liberate diolefins therefrom and leave a resulting cuprous halide incorporated with said cellulosic material.

5. The method of claim 4 wherein the cuprous halide is cuprous chloride.

6. The method of claim 4 wherein the inert solvent is water.

7. The method of claim 4 wherein the inert solvent is 1-butene.

8. The method of claim 4 wherein the conjugated diolefin is 1,3-butadiene.

9. The method of claim 4 wherein the granulated cellulosic fibrous material is sawdust.

10. The method of claim 4 wherein the granulated cellulosic fibrous material is treated with from 2 to 10 weight per cent of a motor lubricating oil.

11. The method of claim 4 wherein the granulated cellulosic fibrous material is treated with from 2 to 10 weight per cent of castor oil.

12. A process for the separation of butadiene from mixtures containing the same which comprises dissolving cuprous chloride in a low-boiling aliphatic olefin; contacting a resulting solution with butadiene at a temperature in the range —20 to 80° F. so as to form a precipitate of a resulting cuprous chloride-butadiene complex; separating and drying said complex; deresinating sawdust having a particle size in the range 30 to 8 mesh with a hydrocarbon solvent; removing said hydrocarbon solvent; intimately contacting said sawdust with about 25 to 50 weight per cent of motor lubricating oil; intimately mixing said cuprous chloride-butadiene complex with oiled sawdust so as to produce a mixture containing from 25 to 75 weight per cent of complex; heating the mixture at a temperature in the range 140 to 210° F. so as to decompose said complex and form a separation reagent; contacting said separation reagent with a gaseous mixture containing butadiene at a pressure in the range of atmospheric to 10 p. s. i. g., temperature in the range of —20 to 80° F. so as to maintain said mixture in gaseous phase so as to react the gaseous butadiene with the separation reagent and recovering the mixture freed of butadiene as a product of the process; decomposing a resulting butadiene-cuprous chloride complex at a temperature in the range of 140 to 210° F.; and recovering butadiene as an additional product of the process.

13. The process of claim 12 wherein the butadiene is contacted with cuprous chloride-olefin solution at a temperature in the range of —20 to 20° F., the separation reagent is contacted with butadiene at a temperature in the range of 10 to 60° F. and the butadiene-cuprous chloride complex is decomposed at a temperature in the range of 170 to 210° F.

References Cited in the file of this patent

UNITED STATES PATENTS

| 2,386,355 | Schulze et al. | Oct. 9, 1945 |
| 2,386,356 | Schulze et al. | Oct. 9, 1945 |
| 2,386,366 | Storment | Oct. 9, 1945 |
| 2,401,114 | Schulze et al. | May 28, 1946 |